May 24, 1932.   S. B. HASELTINE   1,859,701
HAND BRAKE
Filed Nov. 8, 1930
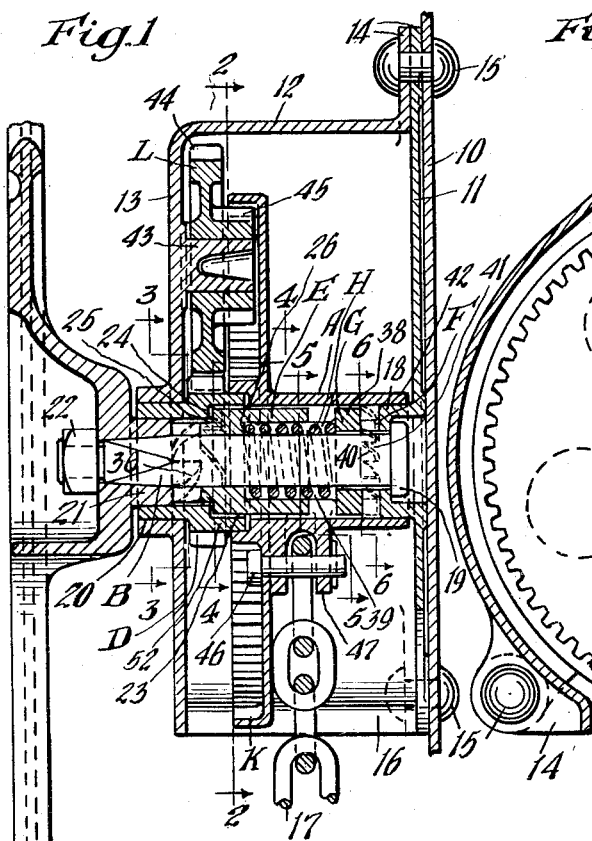
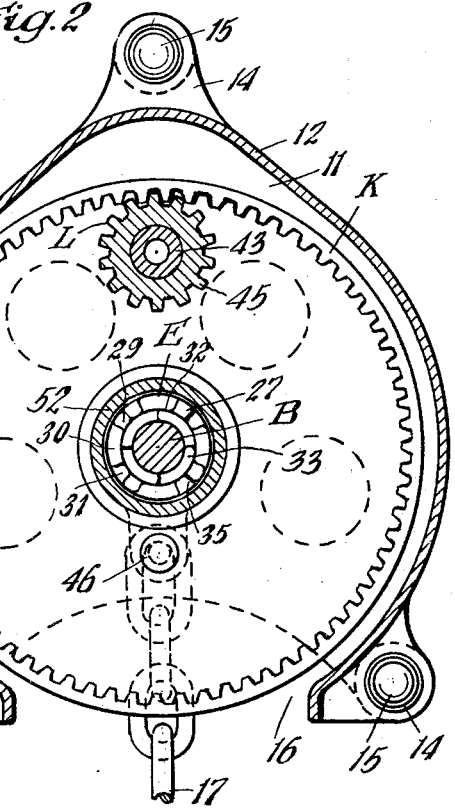
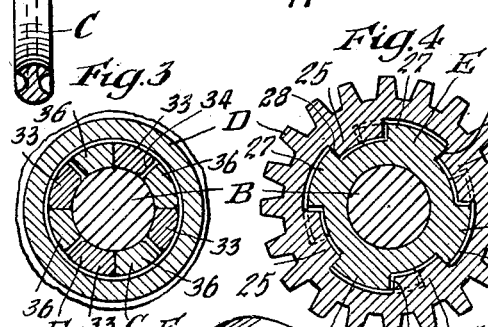
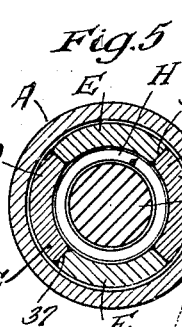
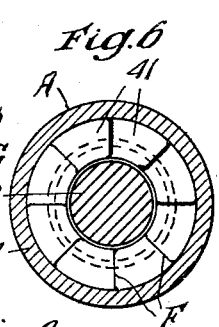
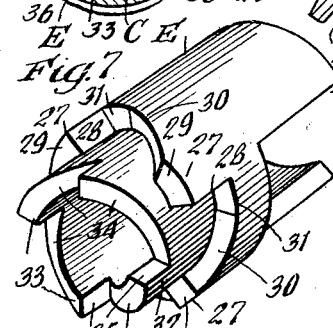
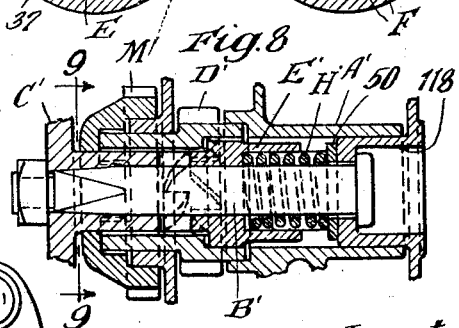
Witness
Wm. Geiger
Inventor
Stacy B. Haseltine
By Joseph Harris
His Atty Patented May 24, 1932

1,859,701

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

HAND BRAKE

Application filed November 8, 1930. Serial No. 494,293.

This invention relates to improvements in hand brakes.

One object of the invention is to provide a simple and efficient hand brake mechanism, especially adapted for railway cars, wherein the brake is actuated by manually controlled rotary means, which is normally operatively connected to the tightening means, operation of said means in one direction effecting tightening of the brakes and in a reverse direction effecting quick release by breaking the operative connection between the same and the tightening means, simple and efficient means being employed for normally clutching the tightening means to the manually actuated means.

A more specific object of the invention is to provide a hand brake mechanism of the character indicated in the preceding paragraph, wherein the manually actuated means is in the form of a rotary hand wheel, and the tightening element is in the form of a rotary member on which the brake chain is wound, rotation of the hand wheel in one direction effecting rotation of the winding element to tighten the brakes, a partial rotation of the hand wheel in a reverse direction releasing the clutch means to permit free running of the winding element without imparting rotation of the hand wheel, thereby eliminating spinning of the latter in release of the brakes and protecting the brakeman against injury.

Another object of the invention is to provide a power-multiplying hand brake mechanism of the gear operated type, of simple and compact design, wherein efficient and reliable clutch means is employed between one of the gear members and the rotary actuating member for operatively connecting the same during application of the brakes, and wherein partial rotation of the actuating member in a direction reverse to the winding movement thereof disengages the clutch to permit release of the brakes without imparting any movement to the actuating member.

Other objects of the invention will more clearly appear from the description and claims hereinafter following.

In the drawings forming a part of this specification, Figure 1 is a vertical, sectional view through the end wall of a railway car, illustrating my improvements in connection therewith. Figure 2 is a vertical, sectional view corresponding substantially to the line 2—2 of Figure 1. Figures 3, 4, 5 and 6 are sectional views, corresponding respectively to the lines 3—3, 4—4, 5—5 and 6—6 of Figure 1. Figure 7 is a detailed, perspective view of a clutch element employed in connection with my improved hand brake mechanism. Figure 8 is a vertical, sectional view, corresponding to the view shown in Figure 1, showing another embodiment of the invention, part only of the brake mechanism being illustrated. And Figure 9 is a vertical, sectional view, corresponding substantially to the line 9—9 of Figure 8.

Referring first to the embodiment of the invention illustrated in Figures 1 to 7 inclusive, the vertical end wall of the railway car is designated by 10 and the operative parts of my improved mechanism are preferably mounted within a two part housing secured to said end wall. As shown, the housing comprises a plate-like member 11 forming the back wall thereof, and a cover section 12 secured to the plate-like member. The cover section 12 is of the shape illustrated in Figure 2 and has a vertical front wall 13 spaced from the plate 11 forming the rear wall of said housing. The cover member 12 is provided with three outstanding lugs 14—14, which register with similar lugs provided on the plate 11. The two sections of the housing are secured together by rivets 15—15 extending through the lugs 14—14 thereof. These rivets are also preferably employed to secure the housing to the end wall of the car, as clearly shown in Figure 1. The housing is open at the bottom, as indicated at 16, to accommodate the brake chain for movement. The brake chain is indicated by 17 and is operatively connected to the brake mechanism of the car in the usual manner.

My improved hand brake mechanism proper, as illustrated in Figures 1 to 7 inclusive, comprises broadly a chain winding drum A, an operating shaft B, a hand wheel C, a driving gear D, a clutch sleeve E, a fixed ratchet F, a rotary ratchet G, a spring H, an internal gear K and an idler gear L.

The operating shaft B serves to rotatably support the ratchet G and the clutch sleeve E and has the rear end thereof journaled in a hollow inwardly projecting boss 18 on the plate member 11. As shown, the rear end of the shaft B is headed, as indicated at 19, said head being accommodated in the hollow boss 18 and holding the shaft against outward movement. The front end of the shaft B projects through the front wall 13 of the housing and has the hand wheel C fixed to the outer end thereof. As shown, the front wall of the housing is provided with a bearing opening 20 of considerably larger diameter than the shaft B, through which the shaft extends. The hand wheel C is provided with an elongated, inwardly extending sleeve-like hub section 21, which surrounds the shaft B and has an opening therein of substantially square cross section which is tapered, so as to fit the outer end of the shaft B, which is correspondingly formed. As will be evident, the hand wheel C is thus fixed to the shaft B and these parts are rotatable in unison. In order to secure the hand wheel in position, the outer end of the shaft B is provided with the usual securing nut 22, which has shouldered engagement with the outer face of the hub section of the hand wheel.

The driving gear D is rotatably supported within the bearing opening 20 of the front wall 13 of the housing, the sleeve-like hub portion 21 of the hand wheel C also being freely rotatably journalled within the hub of the gear D. As shown clearly in Figure 1, the bearing opening 20 is suitably reinforced by an annular flange surrounding the same. The gear member D is of greater length than the hub section 21 of the hand wheel and projects inwardly beyond the same, as clearly shown in Figure 1. The inwardly projecting portion of the gear D is of larger diameter than the journal portion thereof and is provided with peripheral gear teeth, which cooperate with the idler gear member L. Inwardly of the tooth portion thereof, the driving gear D has a cylindrical bearing portion 52, which is also of greater diameter than the journaled portion thereof which is mounted in the opening 20. At the inner end, the opening in the gear D is enlarged as indicated at 23, thereby providing an annular shoulder 24. The shoulder 24 is provided with a series of clutch teeth 25, which cooperate with similar clutch teeth on the clutch sleeve E, hereinafter more fully described.

The clutch sleeve E is rotatably journaled on the cylindrical portion of the shaft B and is of the form illustrated in detail in Figure 7. At the inner end, the clutch sleeve is of larger internal diameter than the shaft B, as clearly shown in Figure 1, so as to accommodate the spring H. The portion of the sleeve E at the outer end thereof, which is journaled on the shaft B, having the opening thereof of smaller diameter than the rear portion of the sleeve, provides an annular abutment shoulder 26 on which the outer end of the spring H bears. Adjacent the outer end, the clutch sleeve has a plurality of clutch teeth 27—27, which cooperate with the clutch teeth of the gear member D and are complementary thereto. As shown, the clutch teeth 27 are four in number, each tooth having a straight, longitudinally extending edge face 28, a flat outer end face 29 and inclined face 30. Between the inclined face 30 of each tooth and the edge face 28 of the next adjacent tooth, the sleeve E is provided with a flat section 31. Outwardly beyond the teeth 27, the sleeve E is of reduced diameter, as indicated at 32, and is provided with a series of tooth-like members 33, each of which has an inclined cam face 34 and a straight edge face 35 coincident with an axial plane of the sleeve. As shown, the tooth-like members 32 are preferably four in number and have the faces 34 thereof inclined reversely to the inclined faces 30 of the teeth 27. The hub section of the hand wheel C is provided with a plurality of teeth 36, corresponding in number to the teeth 33 of the sleeve and complementary thereto. In other words, each tooth 36 has an inclined end face mating with the face 34 of one of the teeth 33 and an edge face coincident with an axial plane of the sleeve, having shouldered engagement with the edge face 35 of one of said teeth 33. At the inner end, the sleeve E is slotted lengthwise at diametrically opposite sides, as indicated at 37—37.

The rotatable ratchet member G comprises a ring-like section 38 and a pair of longitudinally extending diametrically opposed arms 39—39. The arms 39—39 extend into the slots 37—37 of the sleeve E and the ratchet member G is thus rotatable in unison with the clutch sleeve E but slidable lengthwise of the same. The ring-like section 38 of the ratchet member G is rotatably journaled on the shaft B and has an annular series of ratchet teeth 40 at the inner end thereof cooperating with ratchet teeth 41 provided on the boss 18. The cooperating ratchet teeth 40 and 41 are so designed that rotation of the ratchet member G and the connected clutch sleeve E is prevented in a backward direction, that is these parts will be held against rotation in a direction reverse to that in which the shaft B is rotated in tightening the brakes.

The chain winding drum A has a cylindrical sleeve-like portion 42 forming the winding section proper thereof, said sleeve-like portion 42 being journaled at the inner end on the hollow boss 18 and at the outer end on the cylindrical bearing portion 27 of the gear D. As most clearly shown in Figure 1, the outer end portion of the sleeve section of the chain winding drum member is slightly enlarged and the bearing opening thereof, which cooperates with the cylindrical bearing surface 52 of the gear D is also of larger diameter than the remainder of the opening of said sleeve-like section. As clearly illustrated in Figure 1, both the clutch sleeve E and the rotary ratchet member G are freely rotatable within the chain winding drum member. As will be evident, the spring H, which is interposed between the abutment wall 26 of the clutch sleeve E and the ring-like section 38 of the rotary ratchet member G yieldingly forces these two members apart and maintains both the teeth of the clutch member and the teeth of the ratchet member in yielding engagement with the corresponding cooperating teeth.

The internal gear member K is formed integral with the chain winding drum member A and has an annular peripheral flange, which carries the internal teeth.

The internal gear K is driven by the gear D through the medium of the idler gear member L, which is journaled on a stub shaft 43 formed integral with the outer wall 13 of the housing and projecting inwardly therefrom. The gear member L is formed with two gear sections 44 and 45, which are of different diameter, as clearly shown in Figure 1, the gear section 45 being of smaller diameter than the section 44 and meshing with the teeth of the internal gear K. The teeth of the gear section 44 are in mesh with the teeth of the driving gear D.

The brake chain 17 is connected to the chain winding drum by means of a retaining bolt or pin 46, extending through the end link of the chain and alined openings in the web of the gear member K and a spaced projecting lug 47 formed integral with the sleeve-like section of the chain winding drum. The operation of my improved hand brake mechanism as illustrated in Figures 1 to 7 inclusive, is as follows: In applying the brakes, the hand wheel C is rotated in a clockwise direction, as viewed in Figure 2. Inasmuch as the teeth 36 of the hub of the hand wheel have shouldered engagement with the teeth 33 of the clutch member, the latter will also be rotated in a righthand or clockwise direction. As the straight faces 28 of the teeth 27 of the clutch are at this time in shouldered engagement with the corresponding straight faces of the teeth of the gear D, the latter will also be rotated in a clockwise direction. During this action, the rotary ratchet member G will ratchet over the fixed teeth 41 on the boss 18 of the housing, said cooperating teeth preventing backward rotation of the parts in a well known manner. Inasmuch as the gear D meshes with the gear L, which in turn meshes with the internal gear K of the drum, the drum will be rotated in a direction to wind the brake chain 17 thereon and effect tightening of the brakes. To release the brakes, the hand wheel C is turned in a contra-clockwise direction. As will be evident, due to the cooperating ratchet teeth 40 and 41, the member G and the clutch sleeve E, which is connected thereto, will be held against contra-clockwise rotation. Due to the relative movement between the hand wheel C and the clutch member E thus produced, the cam faces of the teeth on the hub of the hand wheel cooperating with the cam faces of the teeth 33 of the clutch sleeve E, will force the clutch sleeve to the right, as viewed in Figure 1, against the resistance of the spring H, thereby disengaging the teeth 27 from the teeth of the gear D. As soon as the clutch sleeve is completely disengaged from the driving gear D, the latter will be free to rotate with respect to the hand wheel and clutch member, thereby permitting free rotation of the chain winding drum in unwinding direction, without imparting any movement to the hand wheel C. As will be evident, the danger of spinning of the hand wheel is thus entirely eliminated and the brakeman protected against possible injury. After the brakes have been thus released, in again rotating the hand wheel C in a clockwise direction to tighten the brakes, the cam faces on the teeth of the hub section will be moved relatively to the cam faces of the teeth 33 of the clutch sleeve E, thereby permitting the sleeve to move to the left, as viewed in Figure 1, through the action of the spring H, thus re-engaging the teeth 27 of the clutch with the teeth of the driving gear D and causing rotation of the latter, as hereinbefore described, and through the gears L and K, rotation of the chain winding drum to wind the chain thereon.

Referring next to the embodiment of the invention illustrated in Figures 8 and 9, the general design of the brake mechanism is substantially the same as that hereinbefore described in connection with Figures 1 to 7 inclusive. The chain winding drum, which is indicated by A' in Figure 8, the operating shaft B', and the hand wheel C' are of precisely the same construction as the corresponding parts hereinbefore described. The driving gear, which is indicated by D', meshes with an idler gear similar to the idler gear L, and the latter meshes with an internal gear similar to the gear K, which is fixed to the chain winding drum A'. The gear D', as shown in Figure 8, extends outwardly beyond the flange, which reinforces the bearing opening of the front wall of the housing of the drum and has a ratchet wheel member M' fixed to the projecting outer end thereof. The ratchet member M' has a locking dog F' cooperating therewith to prevent backward rotation of said ratchet member and the gear D'. The clutch sleeve E' is of identical design with the clutch sleeve E, hereinbefore described, and is held in operative engagement with the cooperating teeth of the hub of the hand wheel C' and the teeth of the gear D' by means of a spring H', which has its opposite ends bearing on abutment faces on the clutch sleeve E' and a spring abutment member 50 bearing on the projecting hollow boss 118, which is integral with the rear wall of the housing and is similar to the boss 18 hereinbefore described. The spring abutment member 50 has a pair of forwardly projecting arms similar to the arms 39 of the member G hereinbefore described, engaging within diametrically opposed guide slots in the clutch sleeve E'.

The operation of the improved hand brake mechanism, as illustrated in Figures 8 and 9, is as follows: In tightening the brakes, the hand wheel C' is rotated in a righthand direction, as viewed in Figure 9, thereby rotating the clutch sleeve E' therewith, which clutch sleeve in turn effects rotation of the gear D', thereby rotating the chain winding drum A'. During the winding operation, backward rotation of the parts is prevented by the locking dog F', which cooperates with the ratchet member M'. In backing up the brakes, the locking dog F' is disengaged from the ratchet member M', thereby permitting proper manipulation of the hand wheel C'. When it is desired to completely release the brakes and prevent spinning of the hand wheel C', the hand wheel is rotated to the left or in a contra-clockwise direction, as viewed in Figure 9, while the locking dog F' is engaged with the ratchet member M'. Backward rotation of the hand wheel C' will cam the clutch sleeve E' out of engagement with the gear D', in a manner similar to that hereinbefore described in connection with the construction illustrated in Figures 1 to 7 inclusive. After the clutch member E' has been completely disengaged from the driving gear D', the locking dog F is released, that is disengaged from the ratchet member M', thereby permitting rotation of the gear D' and movement of the chain winding drum in unwinding direction. As will be obvious, no rotation will be imparted to the hand wheel C' at this time by the rotation of the chain winding drum in unwinding direction, because the clutch sleeve E' is completely disengaged from the gear D'.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotary brake tightening member; of a driving element connected thereto; a rotary manually actuated operating means rotatable in reverse directions; a rotary clutch member normally operatively connecting said operating means and driving element; means for opposing rotation of said clutch member during rotation of said operating means in brake tightening direction, including a retarding member rotatable with said clutch means and movable axially of the same and engageable with said fixed retarding means; spring means interposed between said retarding member and said clutch member for yieldingly holding said clutch member engaged and urging said retarding member toward the fixed retarding means; and cam means on said operating means cooperating with said clutch member, effective when said means is rotated in a direction reverse to the brake tightening direction for disengaging said clutch member to permit free running of the winding means.

2. In a hand brake mechanism, the combination with a rotary brake tightening member; of a driving element connected thereto; a rotary manually actuated operating means rotatable in reverse directions; a rotary clutch member normally operatively connecting said operating means and driving element; means for opposing rotation of said clutch member in one direction, including cooperating fixed and movable members, said movable member being rotatable in unison with the clutch member and movable lengthwise thereof toward and away from the same and spring means for urging said clutch member and movable member apart; and means actuated by rotation of said operating means in a direction reverse to the direction of rotation thereof in tightening the brakes for disengaging the clutch means from said driving element, thereby permitting free rotation of the tightening member with respect to the manually actuated operating means.

3. In a hand brake mechanism, the combination with a rotary chain winding member; of a driving element operatively connected thereto, said driving element having clutch teeth thereon; a rotary manually actuated operating means; a clutch member having shouldered engagement with said operating means, whereby rotation is imparted from the operating means to said clutch member to actuate the latter in chain winding direction; clutch teeth on said clutch member cooperating with the clutch teeth of said element; cooperating cam means on said operating means and clutch element for moving said clutch element to disengage the teeth thereof from said driving element when the operating means is rotated in unwinding direction; a fixed member having ratchet teeth; a ratchet member having teeth cooperating with the teeth of said fixed member; and spring means for urging said clutch member and ratchet member respectively into engagement with the clutch teeth of said driving element and the ratchet teeth of said fixed ratchet member.

4. In a hand brake mechanism, the combination with a chain winding drum; of means for rotating said drum, including a gear member; a shaft; a manually actuated rotary operating member on said shaft; a clutch sleeve rotatable on said shaft, said sleeve and gear having cooperating clutch teeth, said operating member and sleeve having shouldered engagement for rotating said sleeve in one direction, said operating member and sleeve also having cooperating cam means thereon for moving said sleeve lengthwise of said shaft to disengage the teeth thereof from said gear when said operating member is rotated in a reverse direction, thereby permitting free running of the chain winding drum in release of the brakes; a fixed ratchet member and a cooperating ratchet member rotatable in unison with said clutch member and movable lengthwise with respect to the same; and means for yieldingly urging said ratchet and clutch members respectively into engagement with said fixed ratchet member and the clutch teeth of said gear.

5. In a hand brake mechanism, the combination with a rotary chain winding drum; of a gear fixed to said drum; a shaft; a driving gear freely rotatable on said shaft and meshing with said drum gear; a clutch sleeve rotatable on said shaft; cooperating clutch teeth on said sleeve and driving gear; a ratchet member rotatable on said shaft, said ratchet member and clutch sleeve having inter-engaging means thereon preventing relative rotation thereof but allowing longitudinal sliding movement therebetween; a fixed, coaxial ratchet member cooperating with said rotatable ratchet member; spring means reacting between said clutch sleeve and rotatable ratchet member to force the same apart; and a rotary actuating member on said shaft, said actuating member and clutch sleeve having cooperating cam faces thereon for moving said clutch sleeve lengthwise of said shaft when said actuating member is rotated in one direction, said sleeve and actuating member also having shouldered engagement with each other when said actuating member is rotated in a reverse direction for positively driving said clutch sleeve.

6. In a hand brake mechanism, the combination with a winding member; of an element rotatable in one direction for actuating said winding member in brake tightening direction; releasable means for preventing movement of said rotary element in a reverse direction; spring pressed clutch means cooperating with said rotary element; an actuating member for said clutch member for rotating the latter in a direction to tighten the brakes; and cooperating means on said actuating member and clutch element for disengaging the latter from said rotary element when said actuating member is rotated in a reverse direction.

7. In a hand brake mechanism, the combination with a rotary winding member; of means for rotating said winding member including a gear; ratchet means fixed to said gear; a releasable dog cooperating with said ratchet means for preventing backward rotation of said gear; a manually actuated, rotary driving member; sliding spring pressed clutch means normally having clutching engagement with said gear and also having shouldered engagement with said driving member to be rotated therewith in a direction to tighten the brakes; cooperating cam means on said driving member and clutch means for disengaging the clutch means from said gear when said driving member is rotated in a reverse direction.

8. In a hand brake mechanism, the combination with a rotary winding member; of a gear fixed to said member; a driving gear meshing with said first named gear for rotating the winding member to tighten the brakes; releasable means for preventing backward rotation of said driving gear; a manually operated rotary actuating member; clutch means normally operatively connecting said actuating member and driving gear to effect tightening of the brakes when said actuating member is rotated in one direction, said clutch means also operatively connecting the actuating member and driving gear when said releasable means is disengaged to permit backing off or easing up of the brakes upon rotation of said actuating member in a reverse direction; and cooperating cam means on said clutch means and actuating member operative to disengage said clutch means from said driving gear when said actuating member is rotated in said last named direction, while the gear is locked against backward rotation by said releasable means.

In witness that I claim the foregoing I have hereunto subscribed my name this 6th day of November, 1930.

STACY B. HASELTINE.